United States Patent [19]
Calhoun et al.

[11] Patent Number: 5,141,790
[45] Date of Patent: Aug. 25, 1992

[54] REPOSITIONABLE PRESSURE-SENSITIVE ADHESIVE TAPE

[75] Inventors: Clyde D. Calhoun; David C. Koskenmaki, both of St. Paul, Minn.

[73] Assignee: Minnesota Mining and Manufacturing Company, Saint Paul, Minn.

[21] Appl. No.: 439,444

[22] Filed: Nov. 20, 1989

[51] Int. Cl.⁵ .................. C09J 7/02; B32B 3/08
[52] U.S. Cl. ..................... 428/40; 428/143; 428/147; 428/148; 428/343; 428/354
[58] Field of Search ............. 428/343, 354, 355, 356, 428/143, 147, 148

[56] References Cited
U.S. PATENT DOCUMENTS

| | | |
|---|---|---|
| 3,301,741 | 1/1967 | Henrickson .................. 428/343 |
| 3,314,838 | 4/1967 | Erwin .......................... 428/343 |
| 3,331,729 | 7/1967 | Danielson ..................... 428/331 |
| 3,514,326 | 5/1970 | Stow ........................... 428/343 |
| 3,554,835 | 1/1971 | Morgan ........................ 428/352 |
| 4,054,697 | 10/1977 | Reed .......................... 428/354 |
| 4,376,151 | 3/1983 | Parrotta ...................... 428/343 |
| 4,548,862 | 10/1985 | Hartman ....................... 428/323 |
| 4,556,595 | 12/1985 | Ochi .......................... 428/343 |
| 4,737,112 | 4/1988 | Jin ........................... 428/356 |

FOREIGN PATENT DOCUMENTS

| | | | |
|---|---|---|---|
| 0330452 | 8/1989 | European Pat. Off. | ........... 428/343 |
| 0010153 | 2/1982 | Japan | ................... 428/343 |

Primary Examiner—Jenna L. Davis
Attorney, Agent, or Firm—Gary L. Griswold; Walter N. Kirn; Carolyn V. Peters

[57] ABSTRACT

A pressure-sensitive adhesive tape or sheet is reliably repositionable by having a plurality of spaced clumps of particles uniformly distributed over at least one surface of the pressure-sensitive adhesive layer with the tips of the clumps of particles being substantially free from adhesive layer is about 25 μm. Each clump preferably of the pressure-sensitive adhesive layer. Preferred particles are glass beads which may be from 5 to 15 μm in diameter when the thickness of the pressure-sensitive adhesive layer is about 26 μm. Each clump preferably contains from 5 to about 100 particles. The pressure-sensitive adhesive layer can be covered with a carrier web which has a low adhesion surface that is formed with depressions that protect the clumps of particles.

16 Claims, 4 Drawing Sheets

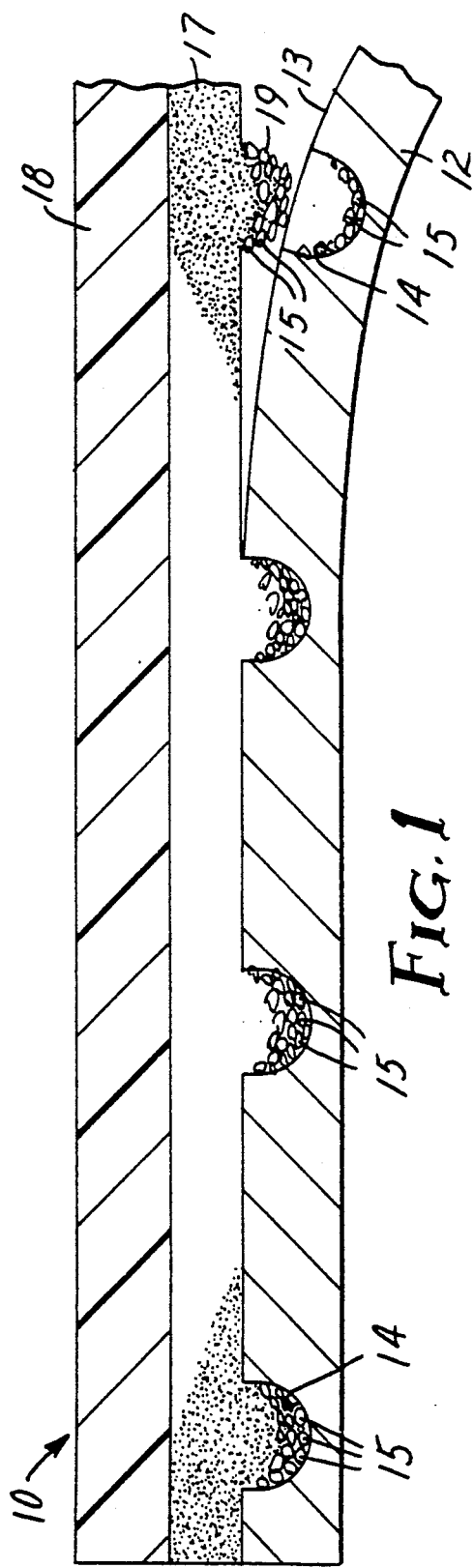
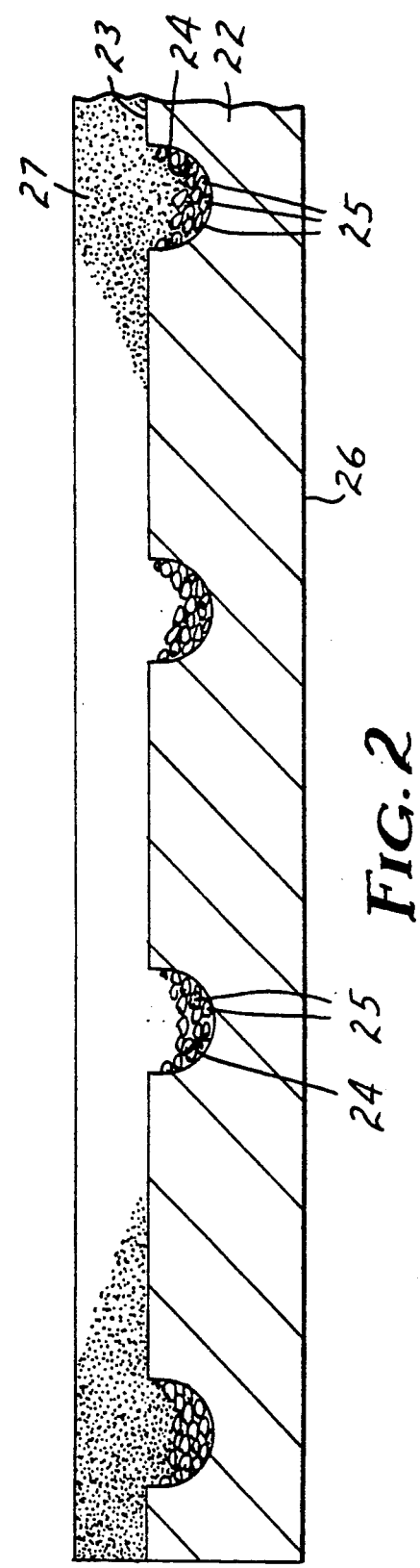

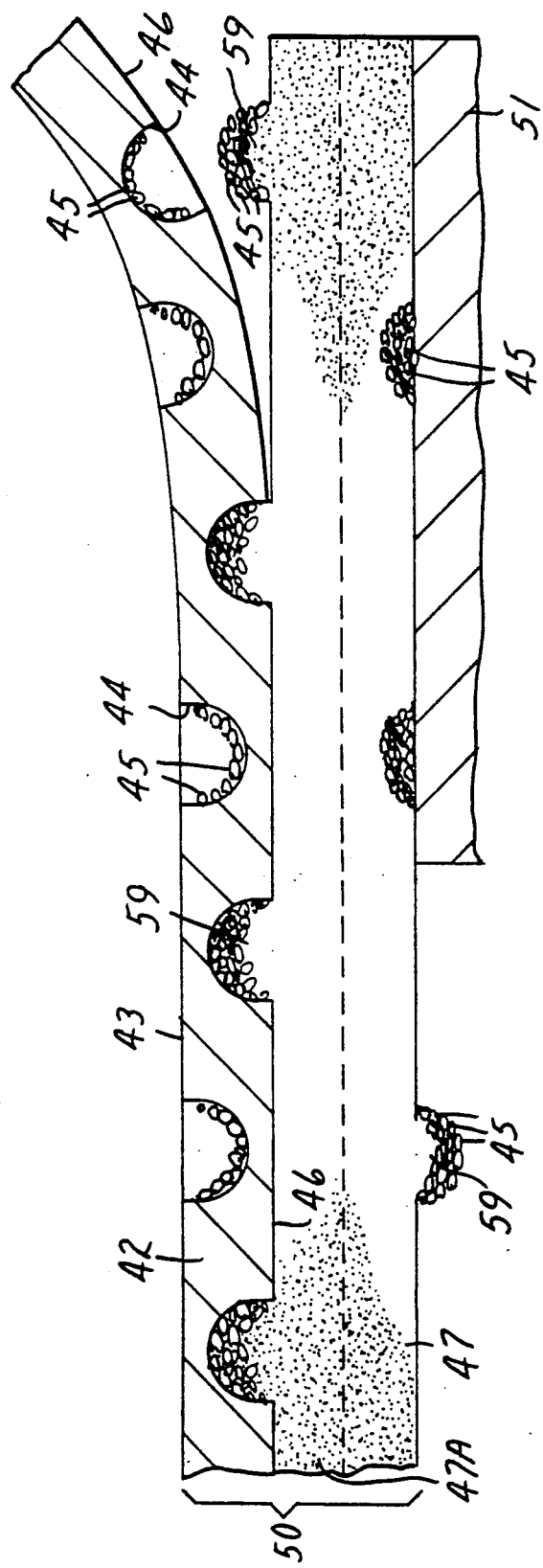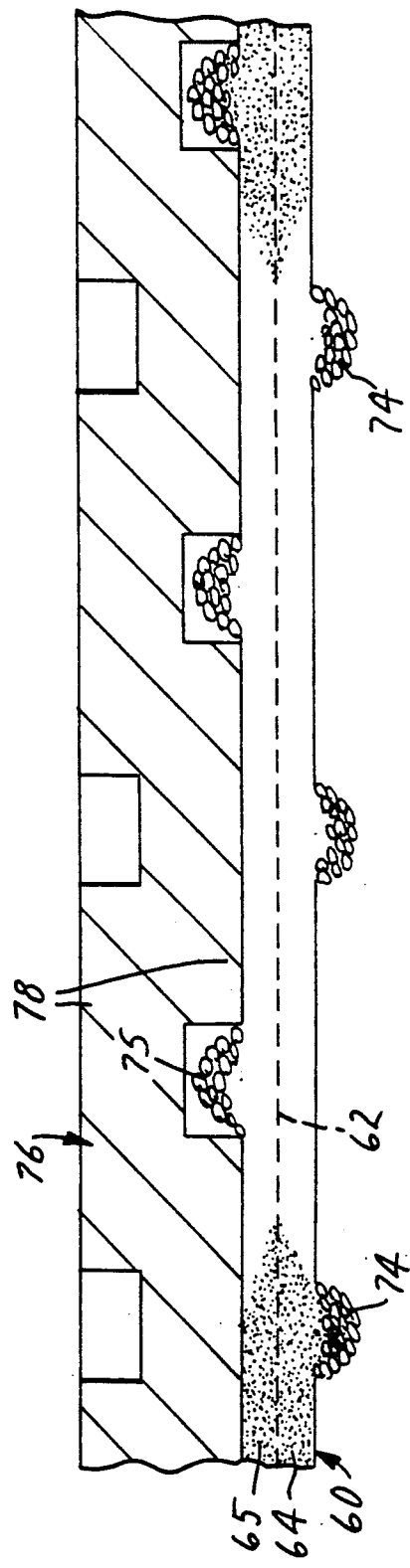
FIG. 5
FIG. 7

REPOSITIONABLE PRESSURE-SENSITIVE ADHESIVE TAPE

BACKGROUND OF THE INVENTION

1. Field of the Invention

The invention concerns repositionable pressure-sensitive adhesive tapes or sheets such as are used in making road signs and for application to vehicles for purpose of information and/or decoration.

2. Description of the Related Art

U.S Pat. Nos. 3,331,729 and 3,413,168 (Danielson et al) describe that a large pressure-sensitive adhesive tape or sheet can be made repositionable by partially embedding into the adhesive layer a large number of tiny hollow microspheres, there called "microballoons". The Danielson tape is made by randomly attracting microballoons to a polyethylene-coated paper liner, partially pressing the microballoons into the polyethylene while it is being softened by heat, applying a pressure-sensitive adhesive over the microballoons, and covering the exposed surface of the adhesive with a decorative film. Then after stripping off the paper liner, the protruding microballoons permit the adhesive-bearing decorative film to be slid along the surface of a substrate until it is precisely positioned, whereupon hand pressure is applied to crush the microballoons, thus allowing the adhesive to contact and to become bonded to the substrate.

Large-scale manufacture of the Danielson article requires considerable skill to ensure that the microballoons are uniformly distributed in order to keep every part of the pressure-sensitive adhesive layer from contacting and sticking prematurely to the substrate. Manufacture also requires a special release liner into which the microballoons can be partially embedded.

U.S Pat. No. 3,314,838 (Erwin) describes a repositionable pressure-sensitive adhesive sheet which is similar to those of the Danielson patents except being made by dispersing microballoons into a spreadable liquid from which the pressure-sensitive adhesive is to be coated. The microballoons "show a tendency to appear at the exposed surface" of the resulting pressure-sensitive adhesive layer, thus giving it a pebbled surface that is said to make the sheet repositionable until the microballoons are crushed (col. 2, lines 56-68).

U.S. Pat. No. 4,376,151 (Parrotta) shows a pressure-sensitive adhesive sheet which, like that of Erwin, has hollow microspheres or microballoons at the surface of its pressure-sensitive adhesive layer, but its adhesive has substantially no adhesive tack except upon application of a threshold pressure. The Parrotta sheet is said to differ from that of Erwin because the latter is activated by very low pressure and is somewhat tacky to the fingers, thus making it unsuitable for the business-form use for which Parrotta sheet is intended.

U.S. Pat. No. 3,301,741 (Henrickson et al.) makes a pressure-sensitive adhesive sheet repositionable by shaping its surface into a pebbly contour of small protrusions that are covered by non-adhesive, continuous, fragile protective caps. Those caps had been formed by embossing polyethylene-coated paper to form a uniform array of depressions, filling the depressions with non-adhesive material such as a solution of polymethylmethacrylate, and wiping the solution off the areas between the depressions. After the sheet has been positioned, pressure is applied, shattering the caps and causing the adhesive to flow around the fragments into intimate contact with a substrate to which the sheet is being applied.

U.S. Pat. No. 4,556,595 (Ochi) makes a pressure-sensitive adhesive sheet repositionable by the random application of tiny solid particles over the adhesive surface. After the sheet has been positioned over a substrate, pressure is applied to force the particles into the adhesive, thus allowing the adhesive to contact and become bonded to the substrate. The Ochi patent preferably employs a "release paper in order to prevent intrusion and dispersion of the non-adhesive solid particles in the adhesive which may occur by application of some pressure during storage" (col. 9, lines 2-7). However, it does not explain how that release paper can prevent the particles from being pushed into the adhesive layer to destroy their utility. Neither does it mention that even if protected from pressure, the particles might migrate into the adhesive during prolonged storage.

In U.S. Pat. No. 3,554,835 (Morgan), the face of a pressure-sensitive adhesive sheet is provided with dots of release material that permit the sheet to be slid over a substrate until pressure is applied to force the adhesive into contact with the substrate.

In U.S. Pat. No. 4,054,697 (Reed et al.), the face of a pressure-sensitive adhesive sheet is provided with a coating of a discontinuous layer of resilient, non-adhesive, solid particles that permit repositioning on a substrate until the particles are deformed under pressure to such an extent as to bring the adhesive and the substrate into fuller contact.

Common to the background discussed above is that when particles are used to make a pressure-sensitive adhesive sheet repositionable, they have always been randomly distributed. Hence, if sufficient particles have been employed to ensure that every portion of the pressure-sensitive adhesive layer is safely kept out of contact with the substrate to which it is being applied, the particles may have such high density as to interfere with the bonding strength. In other words, if high bonding strength is required, it may be necessary to reduce the amount of particles even though some pieces of the pressure-sensitive adhesive sheet might become prematurely bonded to a substrate and thus need to be destroyed.

When the repositionable sheet has a decorative backing such as a thin vinyl film, it can involve the problem that after pressure has been applied to force its pressure-sensitive adhesive into bonding contact with a substrate, the particles or particle fragments that are forced into the adhesive layer can produce a disfiguring pimpling of the decorative backing.

SUMMARY OF THE INVENTION

The invention provides a pressure-sensitive adhesive tape or sheet (here usually called a "tape") that is reliably repositionable and yet can develop bonds to substrates that are virtually as strong as could be obtained in the absence of any repositioning means.

Briefly, the novel pressure-sensitive adhesive tape is made repositionable by having a plurality of spaced clumps of particles substantially uniformly distributed over and protruding from one face of the pressure-sensitive adhesive layer, the tips of the clumps of particles being substantially free from the pressure-sensitive adhesive. Preferably the individual particles are smaller than the thickness of the pressure-sensitive adhesive layer, and substantially every clump extends to a height above the surface of the pressure-sensitive adhesive layer that exceeds the average size of the particles.

As used herein, the term "tape" encompasses broad sheets as well as narrow strips and also other configurations such as alphanumeric characters which can be individually repositionable or, when releasably supported by a carrier in a desired pattern, collectively repositionable. The novel tape can be marketed in long rolls or in individual sheets.

By "substantially uniformly distributed" over one face is meant that the clumps of particles are substantially uniformly distributed over as much of the face of the pressure-sensitive adhesive layer as is necessary to make that layer repositionable. For example, the clumps may be uniformly distributed along only one edge of a wide tape of the invention to allow precise repositioning of that edge, after which the rest of the tape inherently falls into place and hence needs no particles; or the clumps may be uniformly and closely positioned together at the edges of the adhesive layer and progressively further apart toward the center of the layer.

Preferably, the particles have a low coefficient of friction with ordinary substrates such as glass, wood, and steel, thus permitting the novel tape to be slid across the substrate for easy repositioning. The particles preferably are substantially spherical in order to improve the slidability of the tape. Particularly useful are glass beads, being economical to produce at substantially uniform size. Also useful and economical are ceramic, metallic, and polymeric particles. Electrically conductive particles can also be used. The particles can be slightly tacky as long as they do not form permanent bonds upon contacting ordinary substrates, but when they are slightly tacky, it might be necessary to lift the novel tape to reposition it. For example, the particles can be microspheres of adhesive such as those disclosed in U.S. Pat. No. 3,691,140 (Silver).

When the novel repositionable pressure-sensitive adhesive tape is used for decorative purposes, the particles preferably are substantially smaller than the thickness of the pressure-sensitive adhesive layer of the novel tape so that after being pressed into the adhesive layer, they do not mar the exposed face of the tape backing. For example, when the adhesive layer of the novel pressure-sensitive adhesive tape is about 25 $\mu$m in thickness, each of the particles is preferably less than 20$\mu$m in diameter, more preferably from 5 to 15 $\mu$m in diameter. Particles smaller than about 5 $\mu$m may be more difficult and expensive to use than larger particles.

In nondecorative uses such as masking tape, the particles can exceed the thickness of the adhesive.

For most uses, the pressure-sensitive adhesive layer of the novel tape should be at least 25 $\mu$m in thickness in order to conform to irregularities in substrates to which it may be applied.

Two methods of making the novel repositionable pressure-sensitive adhesive tape are preferred. The first makes use of a flexible carrier web having a low-adhesion face and depressions that preferably are uniformly distributed across that face, each of which depressions preferably is large enough to receive a plurality of the particles. This method includes the steps of a) filling the depressions of the carrier web with the particles, then b) applying a pressure-sensitive adhesive layer over that face of the carrier web, and c) causing the pressure-sensitive adhesive to flow into intimate contact with one or more particles in each depression without flowing completely around each of the contacted particles, which pressure-sensitive adhesive layer, when separated from the carrier web, is repositionable by virtue of the particles that adhere to the pressure-sensitive adhesive layer.

When in step b) the pressure-sensitive adhesive layer is applied over the face of the carrier web as a solution or emulsion or as a photopolymerizable liquid, it inherently wets at least one of the particles in each of the depressions and develops adhesion to the wetted particles upon converting the coating to a pressure-sensitive adhesive state. When in step b), a preformed pressure-sensitive adhesive layer is applied over the face, the adhesive layer should be softened (e.g., by heating) to cause it to flow into contact with particles so that those particles remain adhered to the adhesive when it is stripped from the carrier web. Whichever technique is employed, the pressure-sensitive adhesive should not be allowed to flow completely around every particle in a depression, because the tips of the adhered particles or clumps of particles, after the stripping, should be substantially free from the pressure-sensitive adhesive and thus able to provide repositioning.

The second preferred method of making the novel repositionable pressure-sensitive adhesive tape uses a moving medium, such as a rotating drum, having a low-adhesion face and depressions uniformly distributed across that face, each of which depressions preferably is large enough to receive a plurality of the particles. This method includes the sequential steps of a) filling the depressions of the moving medium with the particles, b) continuously contacting the medium with a pressure-sensitive adhesive layer which is sufficiently soft (e.g., by heating) to cause it to flow into intimate contact with one or more particles in each depression without flowing completely around each of the contacted particles, and c) continuously separating the adhesive layer from the moving medium to provide a pressure-sensitive adhesive tape that is repositionable by virtue of clumps of the particles that adhere to the pressure-sensitive adhesive layer.

In step a) of each of the first and second preferred methods, each of the depressions may be only partially filled with the particles, whereupon the particle-bearing face of the pressure-sensitive adhesive layer is formed with tiny mounds of pressure-sensitive adhesive, each of which is capped with particles.

Each of the first and second preferred methods can be used to produce the novel repositionable tape in a variety of forms, four of which are illustrated in the drawing.

THE DRAWING

In the drawing, each figure of which is schematic,

FIG. 1 is a cross-section through a first repositionable pressure-sensitive adhesive tape of the invention which has a permanent backing wherein the aforementioned carrier web serves as a disposable liner;

FIG. 2 is a cross-section through a precursor of another repositionable pressure-sensitive adhesive tape of the invention wherein the carrier web serves as a permanent backing;

FIG. 5 is a cross-section through a repositionable pressure-sensitive adhesive transfer tape produced from the precursor of FIG. 4;

FIG. 7 is a cross-section through the pressure-sensitive adhesive transfer tape produced as shown in FIG. 6, after it has been unwound.

Figure 3:
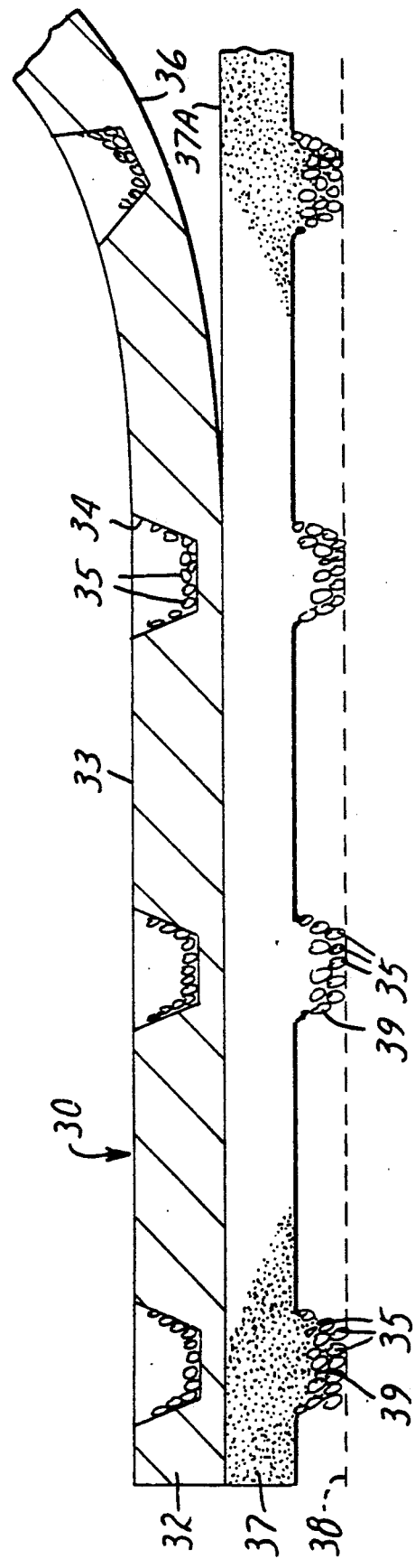
FIG. 3 is a cross-section through a repositionable pressure-sensitive adhesive transfer tape of the invention, one surface of which is repositionable, the carrier web serving as a disposable liner.

The repositionable pressure-sensitive adhesive tape 10 of FIG. 1 has a carrier web 12, one face 13 of which exhibits low adhesion and is formed with a plurality of hemispherical depressions or dimples 14. Each of the dimples contains a large number of tiny particles 15, such as glass beads. Covering the low adhesion face 13 is a pressure-sensitive adhesive layer 17, the opposite surface of which is permanently bonded to a flexible backing 18 that may be a decorative plasticized vinyl film. In making the tape 10, the pressure-sensitive adhesive has flowed into intimate contact with a plurality of the particles in each depression without flowing completely around all of the particles in the depression. Hence, upon stripping off the carrier web 12 as shown in FIG. 1, clumps 19 of particles 15 protrude from pressure-sensitive adhesive layer 17, and a few of the particles are carried away with the carrier web. The clumps 19 permit a piece of the adhesive tape, when applied to a substrate (not shown), to be repositionable, after which pressure applied to flexible backing 18 forces particles 15 into the adhesive layer and allows the adhesive to become strongly bonded to the substrate.

FIG. 2 shows a precursor 20 of a repositionable pressure-sensitive adhesive tape using a carrier web 22, one surface 23 of which exhibits low adhesion and has been formed with a plurality of hemispherical depressions or dimples 24. Each of the dimples contains a large number of tiny particles 25. Covering low adhesion surface 23 of carrier web 22 is a pressure-sensitive adhesive layer 27. The adhesive has flowed into intimate contact with some of particles 25 to form clumps that will protrude from the surface of pressure-sensitive adhesive layer 27 after the illustrated structure has been wound upon itself into a roll (not shown) and then unwound to separate adhesive layer 27 from carrier web 22 at its low adhesion surface 23 while adhesive layer 27 remains permanently bonded to the other surface 26 of carrier web 22, thus its permanent backing.

In FIG. 3, a repositionable pressure-sensitive adhesive transfer tape 30 has a carrier web 32, one surface 33 of which is formed with a plurality of depressions or dimples 34 shaped like truncated cones. During manufacture, a large number of tiny particles 35 are deposited into each of the dimples, and the dimpled surface 33 is then covered with a pressure-sensitive adhesive layer 37 which is allowed to flow into intimate contact with some of the particles in each of the dimples. This is then wound up into a roll (not shown). Each of surfaces 33 and 36 of carrier web 32 exhibits low adhesion, and the pressure-sensitive adhesive layer 37 adheres better to surface 36 than to dimpled face 33. Hence, after being unwound from the roll, the particles 35 that have been wet with the adhesive form clumps 39 that protrude from the exposed surface of pressure-sensitive adhesive layer 37. After the clump-bearing adhesive surface of resulting transfer tape 30 has been positioned on and pressed into contact with a substrate 38 (shown in phantom line), carrier web 32 can be stripped away to expose surface 37A of the adhesive layer 37 to permit it to bond an object such as a decorative film (not shown), to substrate 38.

Figure 4:
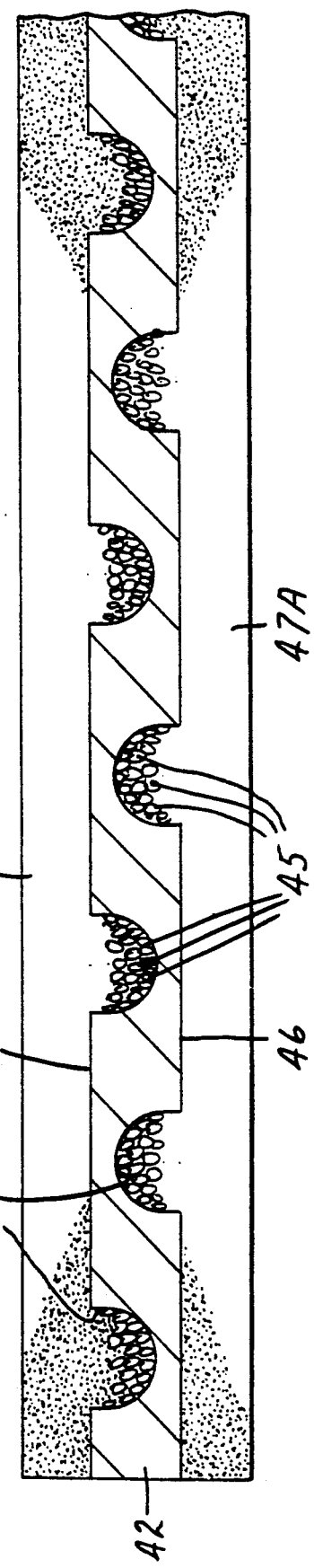
FIG. 4 is a cross-section through a precursor of another repositionable pressure-sensitive adhesive transfer tape of the invention, each surface of which is repositionable, the carrier web again serving as a disposable liner.

FIG. 4 shows a precursor 40 of a repositionable pressure-sensitive adhesive tape using a carrier web 42, each surface 43 and 46 of which is formed with a plurality of hemispherical depressions or dimples 44. During manufacture, a large number of tiny particles 45 are deposited into each of the dimples, and each dimpled surface 43 and 46 is then covered with a pressure-sensitive adhesive layer 47 and 47A, respectively, and the adhesive is allowed to flow into intimate contact with some of the particles in each of the dimples. When this is wound into a roll (not shown), the two adhesive layers 47 and 47A become interbonded to form a single layer. Each of dimpled surfaces 43 and 46 of the carrier web 42 exhibit low adhesion, but the single pressure-sensitive adhesive layers 47, 47A adhere better to the face 46 so that when the roll is unwound, the pressure-sensitive adhesive transfer tape 50 shown in FIG. 5 is obtained. From the exposed surface of the tape 50 protrude clumps 59 of particles 45. After that clump-bearing surface of the adhesive 47 has been positioned and pressed into contact with a substrate 51, carrier web 42 can be stripped away as shown to expose the other surface of combined adhesive layer 47, 47A and its clumps 59 of particles that make that surface also repositionable.

Figure 6:
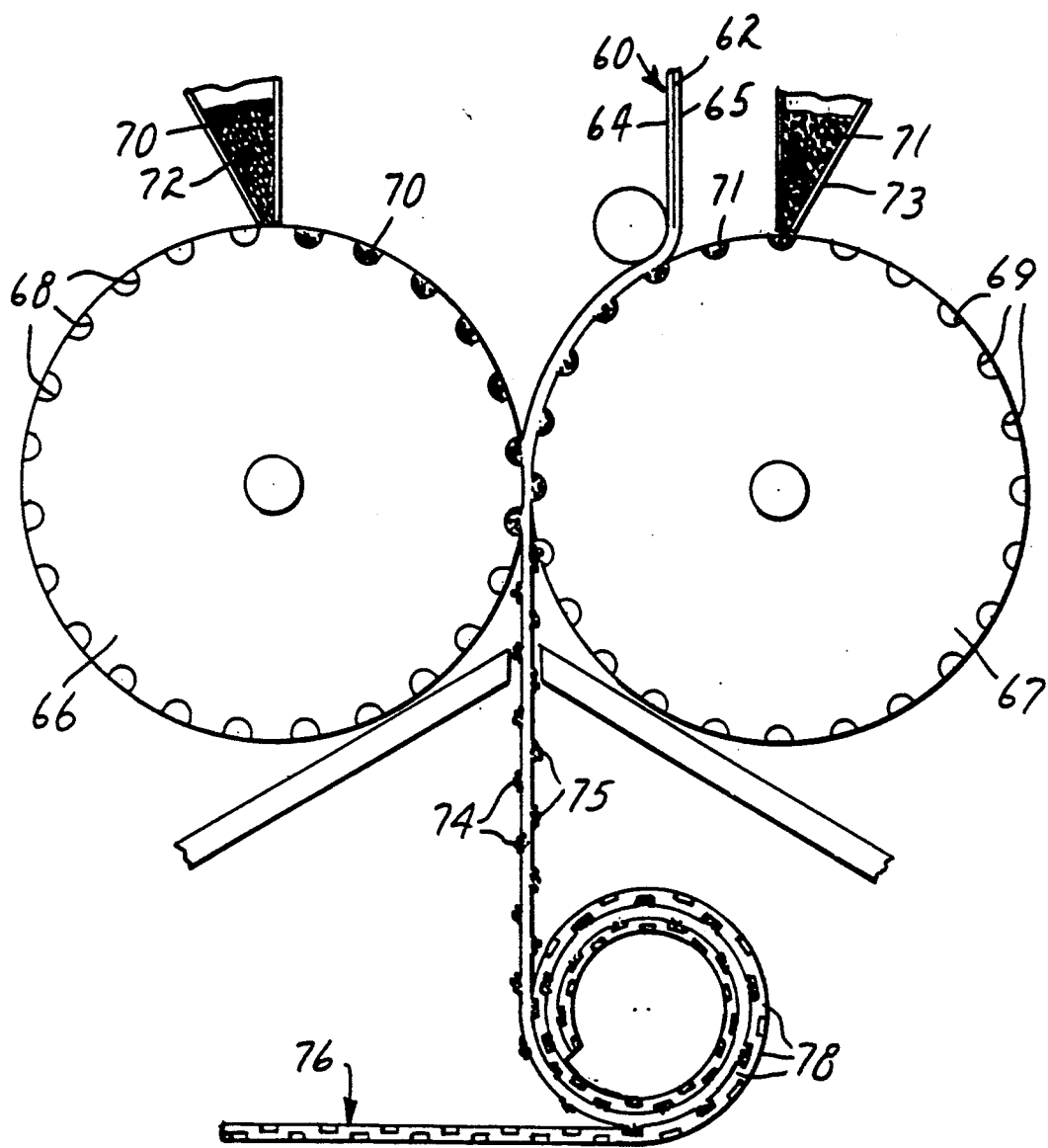
FIG. 6 illustrates the manufacture of a pressure-sensitive adhesive transfer tape of the invention, each surface of which is repositionable.

FIG. 6 illustrates manufacture of a repositionable pressure-sensitive adhesive tape by the second of the above-outlined methods, starting with a double-coated tape 60 having a central scrim 62 and pressure-sensitive adhesive layers 64 and 65 at each face of the scrim. The double coated tape 60 is continuously fed into the nip between a pair of heated rolls 66 and 67, each having a low adhesion surface in which is formed a uniform array of hemispherical depressions 68 and 69, respectively. The depressions are filled with tiny particles 70 and 71 from applicators 72 and 73, respectively, which also wipe the low adhesion surfaces clean of excess particles. The double coated tape 60 is heated by rolls 66 and 67 to cause pressure-sensitive adhesive layers 64 and 65 to flow into intimate contact with some of the particles in each depression so that clumps 74 and 75 of particles 70 and 71, respectively, protrude from each surface of the double-coated tape 60. Upon emerging from the rolls, one surface of the clump-bearing tape is continuously contacted by a flexible carrier web 76, made by embossing a polymeric plastic film to provide a cross-hatched pattern of ridges 78 at each surface outlining rectangular recesses. Ridges 78 have low adhesion surfaces, thus permitting the tape to be wound upon itself into a roll for storage and shipment. Although ridges 78 may depress some of the particles into the adhesive layer, enough of the particles are undisturbed so that after the carrier web is removed, both surfaces of the tape are repositionable. When unwound, one surface of tape 60 and its clumps 74 are exposed as shown in FIG. 7. Then after applying pressure to bond that surface to a substrate (not shown), cross-hatched carrier web 76 can be removed, exposing the other set of clumps 75, over which an object such as a decorative film can be repositioned and then permanently bonded by adhesive layers 64, 65 to the substrate.

DETAILED DISCLOSURE

A preferred carrier web for a repositionable tape of the invention is a low adhesion surfaced polymeric plastic film. When the novel tape is made by the first of the above-outlined methods, the plastic film can be embossed to form the depressions. The embossable plastic film can be self-supporting, but a preferred carrier web is kraft paper, one surface of which has a thin, embossable polyethylene coating which is covered by a silicone release coating. Useful self-supporting plastic films include plasticized poly(vinyl chloride) and biaxially oriented poly(ethylene terephthalate) and polypropylene, all of which are economical and have good strength, toughness, and dimensional stability.

Preferred depression shapes are a truncated cone and a partial hemisphere, each allowing easy transfer of particles to the pressure-sensitive adhesive layer. Other depression shapes are useful, such as a grid of intersecting grooves that can provide elongated clumps of particles.

Instead of using an embossable polymeric plastic film, the carrier web for the first of the above-outlined methods can be any material, such as paper which has a release coating (e.g., silicone), that leaves a plurality of pores at the surface of the paper, each of such pores serving as a depression large enough to receive one or more of the particles. The same material, when used as a moving medium in the second of the above-outlined methods, would also provide a suitable temporary receptacle for the particles.

In each of the two above-outlined methods, each of the depressions preferably is large enough to hold from 5 to about 100 or more particles. At a size less than about 5 particles, the resulting clumps might not have adequate height to keep the pressure-sensitive adhesive safely above the surface of a substrate to which the repositionable tape is to be bonded, assuming that the particles themselves are small compared to the adhesive thickness. However, the particles can be larger than the thickness of the adhesive in certain instances. For example, when there is no need to keep the particles from marring the exposed surface of the backing, they can be larger.

In both of the above-outlined methods, the particles with which the depressions are filled can either be individual particles or clumps of particles. For example, a large number of particles can be adhesively bonded together into a mass that can be broken up into clumps, each preferably large enough to substantially fill one depression. This permits a preformed pressure-sensitive adhesive layer to be pressed against the clumps without any need to soften the adhesive, because adhesive has already flowed into intimate contact with a plurality of the particles during formation of the clumps. The adhesive so used in making such preformed clumps of particles should be nontacky, or nearly so.

In a repositionable tape of the invention, the spacing between adjacent clumps should exceed their average breadth but should not be so great that the pressure-sensitive adhesive between clumps might contact the surface of a substrate to which the novel repositionable pressure-sensitive adhesive tape may be applied. While the maximum spacing between adjacent clumps depends on factors such as the height of the clumps and stiffness of the backing of the novel tape, good repositioning has generally been attained when the spacing between centers of adjacent clumps has been within the range of 0.1 to 0.5 mm (preferably from 0.2 to 0.4 mm). A spacing of substantially less than 0.1 mm might result in inferior bonding strengths.

Preliminary studies indicate that the novel repositionable pressure-sensitive adhesive tape forms bonds that are substantially equal in strength to bonds formed by tapes that are identical except being free from the particles.

The novel repositionable adhesive tape may employ any pressure-sensitive adhesive, preferably one that is aggressively tacky and so forms strong bonds on contact with substrates such as signboards and printed circuit panels. The pressure-sensitive adhesive may be substantially nontacky at room temperature if it becomes tacky at an elevated temperature at which it is to be used. Especially strong bonds are provided by siloxane pressure-sensitive adhesives such as poly(dimethylsiloxane) (Dow Corning DC 284) and phenyl-containing siloxane (GE 6574).

Because silicone adhesives are coated from solution or emulsion, it is difficult to obtain uniform coatings greater than about 50 $\mu$m in thickness. Where thicker pressure-sensitive adhesive coatings are desired, it may be desirable either to apply multiple layers of the adhesive or to photopolymerize an adhesive in situ. For example, monomeric mixtures of alkyl acrylates and copolymerizable monomers such as acrylic acid can be copolymerized by exposure to ultraviolet radiation to a pressure-sensitive adhesive state.

Uses to which the novel repositionable pressure-sensitive tape can be put include the application of decorative and informative markings on aircraft and automotive and railway vehicles; photographic and other layouts for purposes of display and/or reproduction; masking for paint spraying; and accurate positioning of any sheet material such as flexible printed circuitry.

Slidability Value

A horizontal glass plate is heated to about 40° C. and cleaned with methylethylketone. A 15 cm by 23 cm piece of pressure-sensitive adhesive tape to be tested is placed on the glass plate with the adhesive side up. After one minute, the sample is turned over so that the adhesive contacts the glass plate, and an aluminum plate is placed on the sample. The aluminum plate is 13 cm by 20 cm and 0.635 mm thick weighing about 45 grams. Adhered to the side of the aluminum plate contacting the sample are five 3.8 cm-square foam pads, one at each corner and one at the center of the plate. The sample is grasped by the edge and pulled across the glass surface making sure that the sample contacted the glass in all places. An arbitrary rating of 1 to 4 is assigned to the ease of sliding the sample:
  1: slides easily with no grabbing
  2: slides but with slight grabbing
  3: cannot be slid but the sample does not stick to the glass and can easily be picked back up
  4: adheres to the glass.

180° Peel Value

A 2.54-cm wide piece of tape is placed with its adhesive layer against an aluminum panel and pressed into place with a plastic squeegee. After aging for 24 hours under ambient conditions, the 180° Peel Value is determined by 180° peelback with an Instron tester using a crosshead speed of 30.5 cm/min.

The appropriate combination of slidability and peel adhesion is necessary to ascertain effectiveness of our repositionable tape. For example, a tape may have a repositionability of 1 but a peel adhesion of minimum value, clearly predicting that a proper tape was not formed. An optimum combination would be a slidability value of 1 and a peel adhesion approaching that of the adhesive without particles present.

In the following examples, all parts are given by weight.

EXAMPLE 1

A carrier web was made by coating kraft paper 0.155 mm thick with 0.025 mm of polyethylene and overcoating with just enough silicone release material to give complete coverage. About 1000 hemispherical depressions per $cm^2$ were formed in the polyethylene layer in a random array. Their diameters were from about 10 $\mu m$ to 70 $\mu m$.

The depression-bearing surface of the carrier web was flood coated with 6 $\mu m$ to 15 $\mu m$ toner powder (made of magnetite, wax, carbon black, and thermoplastic resin). The surface then was wiped with a tissue in an attempt to remove the toner powder between the hemispherical depressions. A pressure-sensitive adhesive tape having a poly(vinylchloride) film backing of 50 $\mu m$ thickness and a layer of 25 $\mu m$ of acrylic pressure-sensitive adhesive was placed with its adhesive layer against the depression-bearing surface. The vinyl backing was heated with a hand-held heat gun and then quickly rolled with a hand-held roller. After being allowed to cool to room temperature, the pressure-sensitive adhesive tape was peeled off. Examination of its pressure-sensitive adhesive surface with an optical microscope revealed projections about 25 $\mu m$ high with several toner particles in a clump on each projection. The adhesive side of the tape could be slid on a glass plate, but occasionally small regions of the tape would stick to the glass, perhaps because the random distribution of the depressions of the starting polyethylene-coated kraft paper had resulted in a random distribution of the clumps of particles. When this tape was pressed against the glass plate using finger pressure and rubbed with a plastic squeegee, the resulting bond appeared to be as strong as one formed in the same way except with a tape that had no toner particles. The surface of the poly(vinylchloride) remained smooth and was indistinguishable in appearance from that of the tape that had no toner particles.

EXAMPLE 2

The polyethylene layer of a carrier web made as in Example 1 was embossed to provide 1120 depressions per $cm^2$ equally spaced from each other in lengthwise and crosswise rows. Each depression was an inverted truncated cone with a depth equal to the thickness of the polyethylene, i.e., 0.025 mm. The bottom of each depression was 0.05 mm and the top was 0.07 mm in diameter.

The embossed surface was flood coated with glass beads ranging from 5 $\mu m$ to 20 $\mu m$ in diameter. The excess glass beads were both wiped from the surface with a paper towel and then brushed off with a paint brush. A silicone-coated fabric belt was laid on the depression-containing surface, and the back of the silicone belt was rolled with a hand-held roller. This transferred most of the remaining excess particles from the depression-containing surface to the silicone belt.

The adhesive layer of a pressure-sensitive tape as described in Example 1 was then laminated to the depression-containing surface of the kraft paper. The laminator consisted of a heated steel roll and a rubber-coated roll of 75 to 80 durometer, both rolls being 15 cm in diameter. The metal roll was heated to 70° C. and ran in contact with the rubber roll so as to heat it to about 70° C. The laminate was passed thru the rolls at 30 cm/min. under a force of about 10 N/m. The vinyl backing contacted the steel roll, and the kraft paper contacted the rubber roll during lamination.

After peeling the kraft paper from the tape, its pressure-sensitive adhesive layer had protrusions of adhesive that were filled, as well as covered on their tips, with glass beads. There were about 15 glass beads per protrusion. Pieces of this material had Slidability Values from 1 to 1.5. An identical tape that had no glass beads had a Slidability Value of 4.

A piece of tape of this example had a 180° Peel Value of 1366 N/m, compared to a control tape without particles, 1471 N/m. After bonding the tape to a glass plate using a plastic squeegee and considerable hand pressure, the surface of its backing remained smooth, and its appearance was indistinguishable from that of the particle-free control tape.

EXAMPLE 3

The polyethylene layer of a carrier web made as in Example 1 was embossed to form hemispherical depressions in a uniform square array on 0.3-mm centers (about 1120 depressions per $cm^2$). As in Example 1, the hemispherical depressions were filled with 10-$\mu m$ alumina particles which were transferred to a pressure-sensitive adhesive tape having a thin poly(vinylchloride) backing. The transferred clumps of alumina particles enabled the tape to be slid on a glass plate and then bonded thereto with the application of finger pressure and a plastic squeegee. After doing so, the poly(vinylchloride) backing was smooth and gave no indication of the underlying alumina particles.

When examined in a scanning electron microscope, the face of the pressure-sensitive adhesive layer had protrusions which were covered with alumina particles, and each of the depressions of the carrier web still contained some alumina particles. This indicated that during hot lamination, the pressure-sensitive adhesive wet some particles in each depression but did not completely engulf all of the particles. A few alumina particles were adhered to the pressure-sensitive adhesive layer between the protrusions, indicating incomplete removal during the wiping step.

The particle-bearing tape of this example had a Slidability Value of 1 and a 180° Peel Value of 700 N/m.

EXAMPLE 4

A 0.150 mm-thick carrier web of polypropylene filled with 46-weight-percent calcium carbonate was coated on one side with enough silicone to give complete coverage. The silicone coated side of the carrier web was embossed as described in Example 2. The inverted truncated conical depressions were about 10 $\mu m$ larger in both depth and width than in Example 2. The particles, the filling of the depressions, lamination, and testing were as described in Example 2. The resulting particle-bearing pressure-sensitive adhesive tape had a Slidability Value of 2 and a 180° Peel Value of 1243 N/m. After bonding to a glass plate as described in Example 2, the poly(vinylchloride) surface of the tape remained smooth.

EXAMPLE 5

Used in this example was a transfer tape consisting of two coatings of tackified elastomer on either side of a 45-$\mu$m thick scrim ("Crystex" tissue scrim) and supported by paper release liner. The elastomer was a triblock copolymer of polystyrene and polybutadiene.

Glass beads 10 $\mu$m to 35 $\mu$m in diameter were coated into the depressions of an embossed carrier web of Example 4 using the procedures of Example 2. To the bead-containing surface of the carrier web was laminated the exposed face of the adhesive layer of the transfer tape. The carrier web was then stripped off, leaving clumps of glass beads on the underlying adhesive layer. After positioning the clump-bearing face of the adhesive layer on a substrate and pressing this into adherent contact, the paper liner was stripped off to permit the transfer tape to bond an object to the substrate.

Instead, the paper liner could be removed first, allowing the underlying adhesive surface to be bonded to a substrate, followed by removal of the carrier web. The resulting clumps of glass beads would permit an object to be repositioned before being pressed to become securely bonded to the substrate by the transfer tape.

EXAMPLE 6

Example 5 was repeated except that after the first lamination of the transfer tape to the embossed polypropylene carrier web, the paper release liner was removed and saved. The adhesive-coated carrier web was then wrapped upon itself in roll form so that the adhesive contacted the untreated backside of the carrier web and bonded to it. Upon unwinding, the adhesive debonded from the embossed side of the carrier web and had clumps of particles protruding from its surface to provide a linerless repositionable tape. This tape had a Slidability Value of 1.5 and a 180° Peel Value of 1401 N/m. This compared to a control transfer tape without particles that had a Slidability Value of 4 and a 180° Peel Value of 1664 N/m.

EXAMPLE 7

The embossed carrier web of Example 2 was coated with a slurry of acrylate copolymer microspheres of U.S. Pat. No. 3,691,140 (Silver), from 20 $\mu$m to 70 $\mu$m in diameter. The slurry had been made by mixing 4 parts of a stock solution of 20-weight-percent microspheres in water to 1 part of a solution of 25 percent methanol in water. An excess of this slurry was poured onto the embossed carrier web, and a hand-held squeegee was used to wipe off most of the excess. After drying, the coated surface of the embossed carrier web was examined with a light microscope. Clusters of microspheres of the acrylate copolymer were observed to be preferentially located in the embossed depressions.

An acrylic pressure-sensitive adhesive tape of Example 1 was laminated to the microsphere-containing side of the carrier web using a hand-held roller at room temperature. The carrier web and adhesive tape were peeled apart, and the adhesive surface of the tape was examined with a light microscope, revealing a regular array of clusters or clumps of the microspheres. This microsphere-bearing tape was applied to a glass plate using low finger pressure, then lifted off and readily repositioned again and again. By applying greater finger pressure or using a plastic squeegee, an aggressive bond was formed and the easy repositioning feature was lost.

EXAMPLE 8

Example 7 was repeated except that the slurry was 0.5 percent hydroxypropyl methylcellulose ("Methocel" K15MS Dow Chemical) in water with 20-weight-percent expandable beads ("Expancel" 551DU from Nobel Industries, Sweden) of 5 $\mu$m to 30 $\mu$m diameter and 5 percent isopropyl alcohol. After drying the slurry coating, the Expancel beads were primarily located within the depressions in the embossed liner. The clusters of Expancel beads on the surface of the acrylic pressure-sensitive adhesive after lamination and peeling apart were held together by the hydroxypropyl methylcellulose. The resulting pressure-sensitive adhesive tape could be slid on a glass plate at low application pressure and then bonded to the glass with the application of a greater amount of finger pressure.

EXAMPLE 9

Example 2 was repeated except that a platen press was used for lamination of the particle-bearing carrier web to the adhesive-coated poly(vinylchloride). The conditions were 689.5 kilopascals at 80° C. for 5 min. A sample of the resulting tape was studied for electronic cutting of letters. Letters were cut on a GSP Sprint No. 2 letter cutting machine (Gerber Scientific Products; Part No. P28133A) down to 0.5 cm without movement of the cut letter relative to the carrier web. The peel force for removing the adhesive-coated poly(vinylchloride) from the embossed carrier web of this example was 13.3 N/m. This example demonstrated that a repositionable film can be made per this invention that has stability of cut letters and a peel force from the release liner or carrier web compared to the same acrylic pressure sensitive adhesive coated poly(vinylchloride) film that is not repositionable.

EXAMPLE 10

Example 1 was repeated except that the carrier web was 70-$\mu$m uncoated, calendered, bleached kraft paper, and 10-$\mu$m alumina was substituted for the toner powder. The paper web had a random array of surface micropores resulting from the paper making process. These micropores were irregular in shape and depth. This paper was coated with a silicone solution to provide a low-energy surface without filling the surface micropores in the paper, many of which were large enough to accept a large number of the alumina particles. The poly(vinylchloride) tape was peeled from the carrier web, and the surface of the exposed pressure-sensitive adhesive layer was examined under a microscope which showed randomly spaced clumps of the alumina particles, thus verifying that the alumina particles had transferred from the paper micropores to the adhesive surface. These clumps of particles permitted the tape to be slid on a glass plate at light pressure and bonded to the glass plate at higher pressure. The ease of slide was not as desirable as the tape of Example 3 but did demonstrate that an unembossed paper could be used as the carrier web to make a repositionable adhesive tape of this invention. After the tape was bonded to a glass plate using a plastic squeegee, the surface of the poly(vinylchloride) remained smooth.

EXAMPLE 11

Whatman No. 54 hardened filter paper (W & R Balston Ltd., England) was coated by spraying with RAM mold release No. 225 (Whittaker Corp.) and dried in an oven at 120° C. for 30 min. The paper was then coated with hollow glass microbubbles in the size range of 50 μm to 70 μm. The surface was brushed with a paint brush in an attempt to leave glass bubbles only in depressions in the surface of the porous paper. The bubble-coated paper was then laminated to the adhesive coated poly(vinylchloride) film of Example 1 using a hand held roller. Upon being peeled from the porous paper carrier web, the surface of the pressure-sensitive adhesive tape carried a random array of single and clumps of glass microbubbles. Microscopic examination revealed that almost the full diameter of each of the microbubbles protruded beyond the surface of the adhesive layer. This tape could be slid on a glass plate and then, once positioned, it could be bonded using a plastic squeegee that fractured the glass microbubbles.

What is claimed is:

1. Repositionable adhesive tape comprising a pressure-sensitive adhesive layer and a large number of spaced projections comprising pressure-sensitive adhesive and clumps of particles substantially uniformly distributed over and protruding from at least one surface of said adhesive layer, at least the tips of the clumps of particles of the projections being substantially free from said pressure-sensitive adhesive.

2. The repositionable tape of claim 1 wherein the individual particles are smaller than the thickness of the pressure-sensitive adhesive layer.

3. The repositionable tape of claim 1 wherein the height of substantially every projected clump above the surface of the adhesive layer exceeds the average size of said particles.

4. The repositionable tape of claim 1 further comprising a carrier web having a low adhesion surface which is formed with depressions that protect said projections.

5. The repositionable tape of claim 4 wherein each of said depressions protects a single projections.

6. The repositionable tape of claim 5 wherein each of said projection substantially fills a depression.

7. The repositionable tape of claim 4 wherein each depression is significantly larger than the projection it protects.

8. The repositionable tape of claim 1 wherein a plurality of spaced projections comprising clumps of said particles are uniformly distributed over each surface of said pressure-sensitive adhesive layer.

9. The repositionable tape of claim 1 wherein the spacing between centers of adjacent projection of said particles exceeds their average breadth.

10. The repositionable tape of claim 1 wherein each of said particles is a tiny ball of adhesive.

11. The repositionable tape of claim 1 wherein each of said particles is electrically conductive.

12. A tape according to claim 8 wrapped upon itself in roll form and including a carrier web interposed between windings wherein said carrier web has at least one low adhesion surface with depressions in register with said projections.

13. A tape according to claim 12 wherein both major surfaces of said carrier web have said low adhesion surfaces and said depressions, and wherein said adhesive preferentially adheres to one of said low adhesion surfaces, whereby said carrier web acts as a strippable, protective layer when said row is unwound and said tape is adhered to a substrate.

14. A tape according to claim 1 wrapped upon itself in roll form and including a carrier web interposed between windings and wherein only one major surface of said carrier web has said low adhesion surface and wherein said adhesive preferentially adheres to the opposite major surface of said carrier web thereby forming a permanently adhered backing for said tape when said roll is unwound, 15. A repositionable adhesive tape according to claim 1 wherein said projections cover about 5% of the surface area of the adhesive.

16. A repositionable adhesive tape according to claim 1 wherein said projections irreversible collapse wit the application of hand pressure to said tape.

* * * * *

UNITED STATES PATENT AND TRADEMARK OFFICE
CERTIFICATE OF CORRECTION

PATENT NO. : 5,141,790
DATED : Aug. 25, 1992
INVENTOR(S) : Calhoun et al.

It is certified that error appears in the above-identified patent and that said Letters Patent is hereby corrected as shown below:

Abstract, starting at line 6 correct as follows:

After "adhesive" insert --, which particles are smaller than the thickness of the pressure-sensitive adhesive layer.--

Delete --layer is about 25 um. Each clump preferably of the pressure-sensitive adhesive layer.--

In line 10, "26" should be --25--

Col. 13, line 32, Delete "projected clump" and replace with --projection--

Col. 13, line 39, "Projections" should be --projection--

Col. 14, line 49, "Irreversible" should be --irreversibly--

Col. 14, line 49, "wit" should be --with--

Signed and Sealed this

Twenty-seventh Day of December, 1994

*Attest:*

BRUCE LEHMAN

*Attesting Officer*     *Commissioner of Patents and Trademarks*